United States Patent
Mukherjee

(10) Patent No.: US 7,522,724 B2
(45) Date of Patent: Apr. 21, 2009

(54) SYSTEM AND METHOD OF TRANSMISSION OF GENERALIZED SCALABLE BIT-STREAMS

(75) Inventor: Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

(21) Appl. No.: 11/030,096

(22) Filed: Jan. 7, 2005

(65) Prior Publication Data

US 2006/0153373 A1    Jul. 13, 2006

(51) Int. Cl.
    *H04L 9/00*    (2006.01)
(52) U.S. Cl. .......................... 380/42; 380/210; 380/256
(58) Field of Classification Search .................. 380/42, 380/210, 256
    See application file for complete search history.

(56) References Cited

U.S. PATENT DOCUMENTS

| | | | | |
|---|---|---|---|---|
| 6,351,491 | B1 * | 2/2002 | Lee et al. ............... | 375/240.03 |
| 6,392,705 | B1 * | 5/2002 | Chaddha .................. | 348/388.1 |
| 6,980,607 | B2 * | 12/2005 | Becker et al. ............... | 375/341 |
| 2002/0018565 | A1 * | 2/2002 | Luttrell et al. ............... | 380/217 |
| 2003/0021296 | A1 * | 1/2003 | Wee et al. .................... | 370/474 |
| 2004/0028227 | A1 * | 2/2004 | Yu .............................. | 380/201 |
| 2004/0196972 | A1 * | 10/2004 | Zhu et al. ...................... | 380/45 |
| 2004/0196975 | A1 * | 10/2004 | Zhu et al. .................... | 380/258 |
| 2005/0084132 | A1 * | 4/2005 | Wee et al. .................... | 382/100 |
| 2005/0185795 | A1 * | 8/2005 | Song et al. .................. | 380/218 |
| 2005/0276416 | A1 * | 12/2005 | Zhu et al. .................... | 380/210 |
| 2006/0126841 | A1 * | 6/2006 | Pal et al. ..................... | 380/255 |
| 2007/0064937 | A1 * | 3/2007 | Van Leest et al. ........... | 380/201 |

\* cited by examiner

*Primary Examiner*—Kambiz Zand
*Assistant Examiner*—Kari L Schmidt

(57) ABSTRACT

A method of encrypting a transmission unit of a generalized scalable bit-stream includes, encrypting a plurality of logic units of the transmission unit using a unique encryption key for each logic unit, where the unique encryption keys for the transmission unit form a set of encryption keys. The method further includes providing a user with a subset of decryption information that corresponds to a subset of the encryption keys. The subset of the decryption information allows decryption of a subset of the logic units in the transmission unit up to a predetermined decryption level of the transmission unit.

13 Claims, 8 Drawing Sheets

SYSTEM AND METHOD OF TRANSMISSION OF GENERALIZED SCALABLE BIT-STREAMS

BACKGROUND

Multimedia content may be accessed through any number of diverse networks and terminals. Networks over which multimedia content may be delivered include telephone lines, wireless networks, and high-speed optical fibers. For example, a user may request, and receive, multimedia content from a server on the Internet.

Users may use a variety of terminals to access such multimedia content, ranging from handheld devices to high definition workstations. Users generally access networks using various devices capable of delivering content in a variety of formats. Faced with variations in the types of content that may be transmitted or received by a user, a rigid media representation format, producing decompressed content only at a fixed resolution and quality, presents various limitations. For instance, certain users may be unable to receive certain content, or may receive poor quality and resolution data due to the limitations of their network connections and accessing devices. In addition, the inability to provide content in formats compatible with new devices has somewhat inhibited the growth of new rich media and the devices on which they are used, because such rich content can be used only by high-end devices.

One technique for providing media content to users having a variety of capabilities and preferences is to provide multiple versions of the media that are suited to a variety of capabilities and preferences. While this approach works with delivery models where the recipient directly connects to the media originator, significant redundancy and inefficiency may be introduced for any other scenario, leading to wasted bandwidth and storage. Redundancies and inefficiencies are particularly problematic when catering to a large consumer base, thereby mandating maintenance of numerous versions of similar content.

Another technique is the use of generalized scalable bit-streams. A generalized scalable bit-stream often scales simultaneously along multiple logical dimensions. For such bit-streams, adaptation primarily consists of deleting bit-stream segments followed by other minor editing operations conducted on fixed length fields. Generalized scalable bit-streams can typically accommodate a variety of users by automatically addressing a given user's computing power and connection speed. One example of a generalized scalable bit-stream is JPEG2000, which is a scalable standard for still images that seeks to combine various types of scalability including image quality scalability and image resolution scalability in a format specific to the universal JPEG2000 compressed data. The use of JPEG2000 generally enables distribution and viewing of images of various qualities and resolutions using various connections and devices.

Various types of bit-stream scalability can be devised depending on the type of media content addressed. For example, signal-to-noise ratio ("SNR" or quality) scalability refers to progressively increasing quality as more and more of the bit-stream is included, and applies to most types of media. Resolution scalability refers to fineness of spatial data sampling, and applies to visual media such as images, video, and 3D images. Temporal scalability refers to fineness of sampling in the time-domain, and applies to video and other image sequences. Certain scalability pertains solely to audio, such as number of channels and sampling frequency. Different types of scalability can co-exist, so as to provide a range of adaptation choices.

Security is generally a concern in transmitting data over networks. Although bit-streams may be encrypted, it is difficult to prevent users from accessing content or levels of content which they are not authorized to access if the bit-streams include levels of content beyond that which the users are authorized to access.

It would thus be desirable to provide a method for transmitting generalized scalable bit-streams with greater access control.

SUMMARY

A method of encrypting a transmission unit of a generalized scalable bit-stream includes, encrypting a plurality of logic units of the transmission unit using a unique encryption key for each logic unit, where the unique encryption keys for the transmission unit form a set of encryption keys. The method further includes providing a user with a subset of decryption information that corresponds to a subset of the encryption keys. The subset of the decryption information allows decryption of a subset of the logic units in the transmission unit up to a predetermined decryption level of the transmission unit.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present embodiments are described by referring mainly to an exemplary embodiment thereof. In the following description, numerous specific details are set forth in order to provide a thorough understanding of the present embodiments. It will be apparent however, to one of ordinary skill in the art, that the present embodiments may be practiced without limitation to these specific details. In other instances, well known methods and structures have not been described in detail so as not to unnecessarily obscure the present embodiments.

A method for securely transmitting generalized scalable bit-streams according to subscription levels is described herein. The term "subscription" is used throughout the present description for purposes of simplicity. As such, the term "subscription" should be understood as having its ordinary meaning and may also be defined as including authorization and preference.

The bit-streams may include one or more transmission units, where each transmission unit includes a plurality of logic units. In some embodiments, a level of subscription may correspond to a number of logic units of the plurality of logic units in each transmission unit. For example, a user may subscribe to a level of subscription that includes four of eight logic units in a transmission unit. In addition, the generalized bit-streams may be encrypted prior to transmission by following encoding dependencies in the bit-stream. As described in greater detail herein below, the decryption information based on the encryption keys used to encrypt the bit-streams may be provided to users according to their subscription levels. More particularly, the levels to which users subscribe determines the decryption information they are provided. Thus, in one respect, the decryption information enables a user to decrypt information in a bit-stream up to the user's subscription level. As such, the level of information provided to particular users may be controlled.

In some embodiments, multi-dimensional scalability of bit-streams may be used to correspond to subscription levels. For example, generalized scalable bit-streams are typically logically multi-dimensional. Thus, the generalized bit-stream may include a predetermined number of logic units in one or more dimensions, or layers of the dimensions.

In some embodiments, the decryption information may be provided as part of bit-stream description metadata. The bit-stream description metadata may be transmitted with each transmission unit and describes the high-level structure of the bit-stream. The metadata may provide information regarding the bit-stream, such as, the dimensions of the multi-dimensional logical model, the mapping of each logic unit to the actual bit-stream segments belonging to the logic unit, etc. The bit-stream description metadata may be part of an unencrypted header of the bit-stream for each transmission unit.

Figure 1:
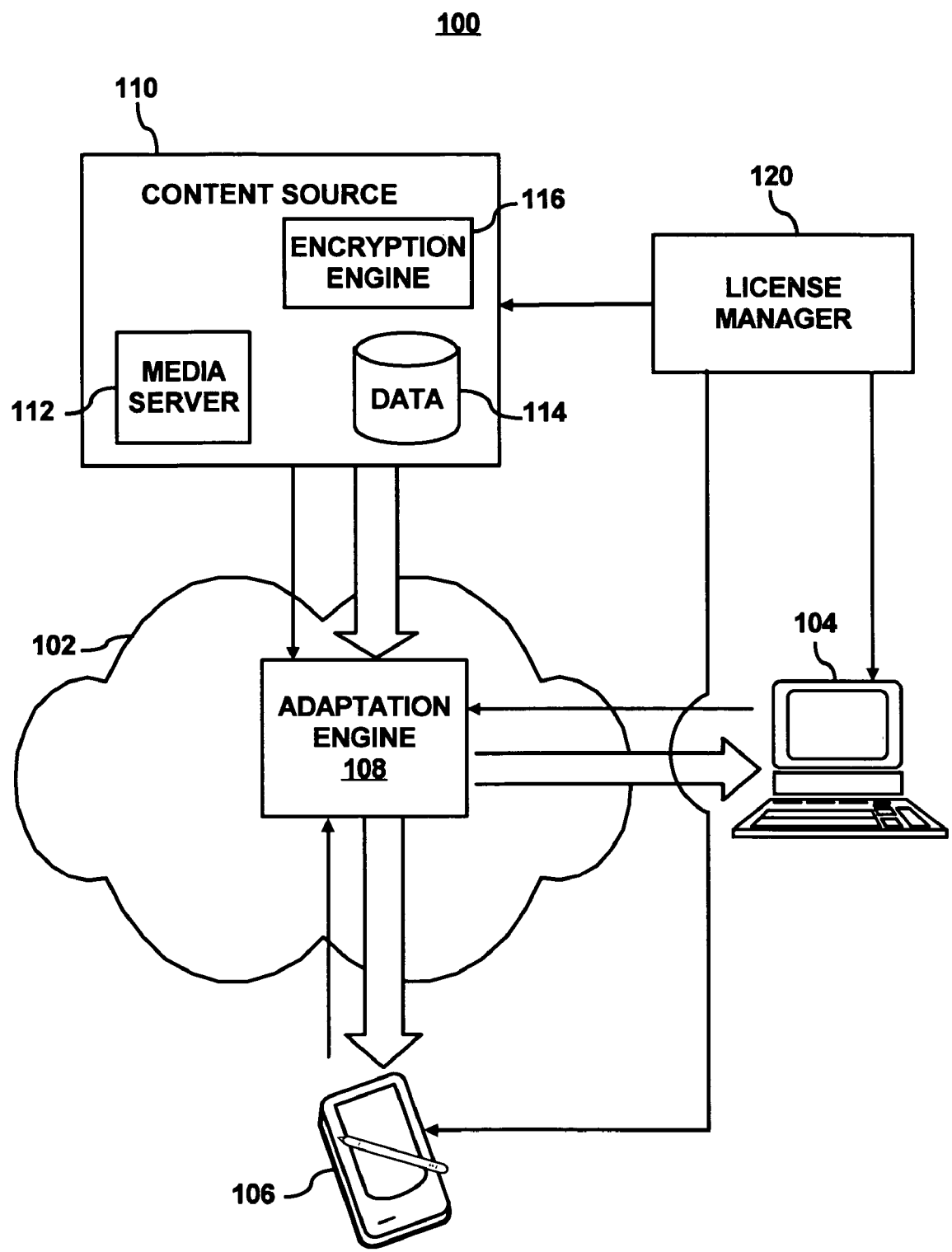
FIG. 1 illustrates a simplified example of a network through which multimedia content may be transmitted, according to an embodiment of the invention.

FIG. 1 illustrates a simplified example of a network 100 through which multimedia content may be transmitted. The network 100 may be configured to access the Internet 102 and may include a content source 110 having a media server 112, a data store 114 to store multimedia content, and an encryption engine 116 to encrypt multimedia content before it is provided to client devices, such as client devices 104, 106. Although shown as one entity, the media server 112 may be part of a separate entity connected to the content source 110 through, for example, a wired connection, a wireless connection, or a combination thereof. In addition, the network 100 may include any reasonably suitable number of content sources 110 and servers 112 without departing from a scope of the network 100 illustrated in FIG. 1.

In general, the content source 110 and the media server 112 are devices that provide the capability to process and store data, and to send and receive such data. In this respect, either or both of the content source 110 and the media server 112 may comprise a computer system or other type of device that may not be typically considered computer systems but have similar capabilities.

The encryption engine 116 may encrypt content to be provided to client devices 104, 106. Although the encryption engine 116 is shown as being part of the content source 110, in some embodiments, the encryption engine 116 may be located outside of the content source 110.

A stationary client device 104 and a mobile client device 106 are shown in communication with the network 100. The client devices 104, 106 may be coupled to the network 100 via a wired connection, a wireless connection, or a combination thereof. Although two client devices 104, 106 are illustrated in FIG. 1, it should be understood that any reasonably suitable number of client devices 104, 106 may be in communication with the network 100 without deviating from a scope of the network 100.

Also shown in FIG. 1 is a license manager 120 configured to, for instance, manage encryption keys for the encryption engine 116. In some examples, the license manager 120 provides the encryption engine 116 with the encryption keys with which to encrypt content provided to the client devices 104, 106. The license manager 120 may also provide decryption information to the client devices 104, 106. The license manager 120 may provide the decryption information to the client devices 104, 106 by transmitting the decryption information with the content, separately from the content, or provide the decryption information in another way, such as, through recordable media.

Although an adaptation engine 108 is shown in FIG. 1, the adaptation unit is not necessary for the embodiments described herein. However, the adaptation engine 108 may be provided to adapt content at a point between transmission of content from the content source 110 and receipt of the content at a client device 104, 106. The adaptation engine 108 may include any reasonably suitable adaptation engine, including, for instance, an untrusted adaptation engine. In general, the network 100 enables data to be provided from either or both of a content source 110 and an adaptation engine 108, to one or more of the client devices 104, 106.

The data from the content source 110 may be in the form of a scalable bit stream. A scalable bit stream is a bit stream where a smaller subset of the whole bit stream produces representations at a lower quality, resolution, etc. Different types of scalability (for instance, quality, resolution, temporal, interactivity, etc.) apply to different types of media, and often more than one kind is combined in a particular media type. Furthermore, in rich media content, several independent elements may be combined (for instance, video, animation, 3-D audio, etc.).

A logical model may be created in a generalized scalable bit-stream. In a logical model, a bit-stream may be divided into several logical segments called transmission units. Each transmission unit may be modeled as a one dimensional or a multi-dimensional hypercube, with a certain number of layers in each dimension. For example, for fully scalable video, each transmission unit is a Group of Frames (typically 16 or 32), each of which may be encoded in a 3-dimensional temporal-spatial-quality scalable manner.

Figure 2:
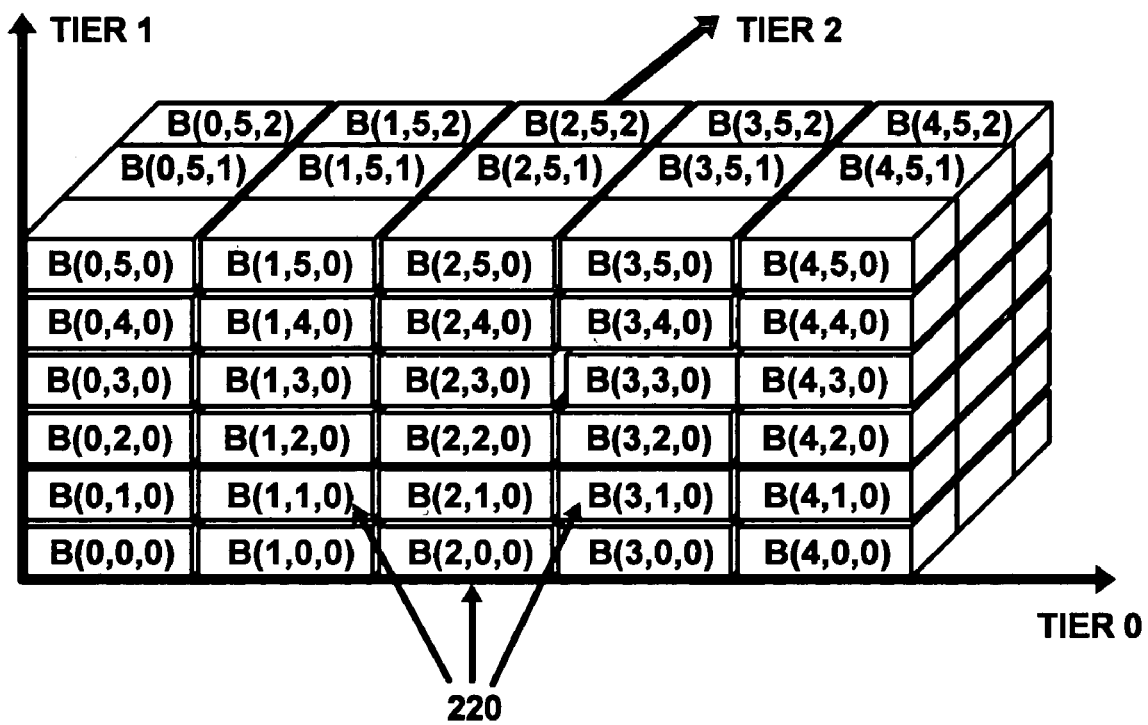
FIG. 2 is an illustration of a hypercube representation of a generalized scalable bit-stream, according to an embodiment of the invention.

FIG. 2 is an illustration of a hypercube 210 representation of a generalized scalable bit-stream. Although the hypercube 210 shown in FIG. 2 is depicted as being three-dimensional, the hypercube 210 may have any reasonably suitable number of dimensions. For example, the hypercube 210 may be one, two, four, five, or more dimensional, etc.

Without loss of generality, if a scalable bit stream contains L nested tiers of scalability, with the ith tier containing $l_i$ layers, where i=0, 1, . . . , L−1, then the bit stream may be represented by $l_0 \times l_1 \times \ldots \times l_{L-1}$ logical data segments $B(j_0, j_1, \ldots, j_{L-1})$, where $j_i$=0, 1, . . . , $l_i$−1. Each cell of the hypercube 210 represents a logic unit 220. As shown in FIG. 2, the logic unit 220 is indicated by a vector of integer coordinates, $B(j_0, j_1, \ldots j_{L-1})$, for $j_i$=0, 1, . . . , $l_i$−1. Each logic unit 220 maps to a certain segment in the bit-stream, and may map to multiple bit-stream segments.

For the generalized scalable bit-stream, bit-stream segments may be deleted, followed by minor editing operations conducted on fixed length fields. The logical hypercube 210 may be truncated along multiple dimensions. For example, a JPEG2000 bit-stream embeds multiple resolution levels, and multiple quality levels simultaneously. From this bit-stream, a first set of bit-stream segments could be deleted to obtain a low resolution, but a high quality version, or alternatively, a second set of bit-stream segments could be deleted to obtain a high resolution, low quality version.

This truncation process may be adapted to provide different levels of service to different users without actually removing the bit-stream segments from the bit-stream. For example, a first user may subscribe to receive low-resolution, high-quality content while a second user may subscribe to receive high-resolution, low-quality content. As described in greater detail herein below, different levels of subscription may be provided by individually encrypting each logic unit and providing the user with just enough decryption information to decrypt the content up to the user's subscription level. Thus, a user who subscribes to receive a 2×2×2 portion of the hypercube 210 will receive enough information to decrypt logic unit B(1,1,1) and all of the logic units below B(1,1,1) in the hypercube 210.

In another example, the hypercube may be a one-dimensional hypercube, including logic units B(0,0,0) to B(4,0,0). Thus, the user who subscribes to receive a 1×3 hypercube will receive enough information to decrypt logic unit B(2,0,0), B(1,0,0) and B(0,0,0).

Figure 3:
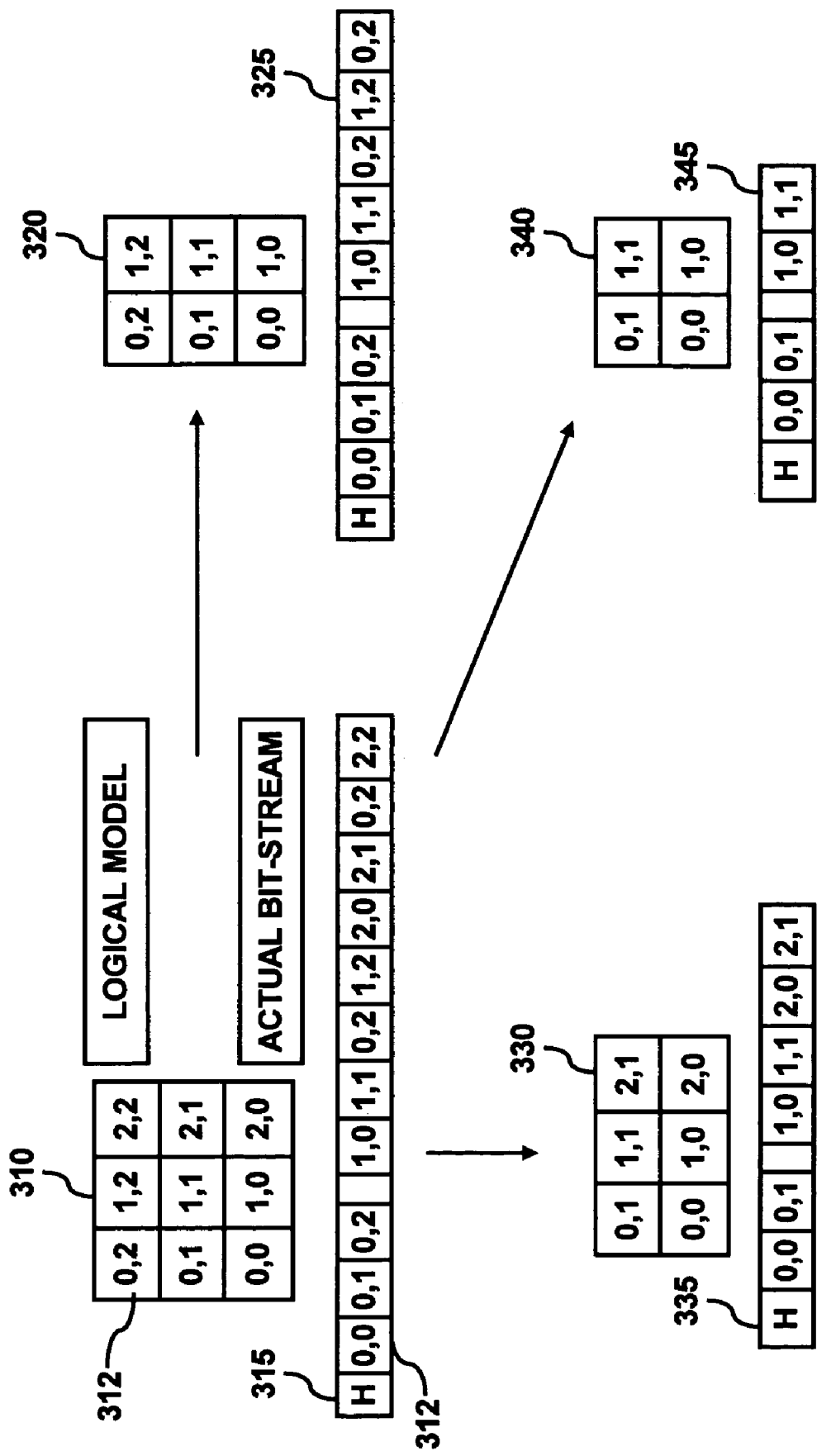
FIG. 3 illustrates an example of an adaptation for a two-dimensional, 3×3 hypercube, and its corresponding actual bit-stream, according to an embodiment of the invention.

FIG. 3 illustrates an example of various subscription levels for a two-dimensional, 3×3 hypercube 310, and its corresponding actual bit-stream 315. In the example shown, the actual bit-stream 315 is obtained by scanning the hypercube 310 column-wise from left to right, and each column from bottom to top. In other examples, actual bit-streams may be obtained, for instance, by scanning the logic units 312 of the hypercube 310 row-wise from bottom to top, and each row from left to right.

As shown in FIG. 3, the actual bit-stream 315 includes a header H, followed by logic units 312 from the hypercube 310. The logical first logic unit 312 of the actual bit-stream is (0,0), followed by the logic units (0,1), (0,2), (1,0), (1,1), (0,2), (1,2), (2,0), (2,1), (0,2), and (2,2). As seen in the actual bit-stream 315, some logic units 312, such as (0, 2), map to multiple segments in the actual bit-stream 315. This occurs because the hypercube 310 represents a logical model of the actual bit-stream 315 and some logic units 312 of the logical model may occur more than once in the actual bit-stream 315.

Metadata transmitted with the actual bit-stream 315 may include information mapping the logical model to the actual bit-stream 315, thus identifying where logical units, such as logic unit 312, are to be inserted in the actual bit-stream 315. For example, metadata would describe that logic unit (0, 2) of the hypercube 310 shown in FIG. 3 is to be inserted three times in the actual bit-stream 315.

As an example, the tier extending horizontally may represent the resolution of an image while the tier extending vertically may represent the quality of an image. Thus, subscribing to receive (by receiving decryption information for) one less column from the hypercube 310 would represent subscribing to a lower quality version of the media content. Subscribing to receive one less row from the hypercube 310 would represent subscribing to a lower resolution version of the media content.

FIG. 3 further illustrates logical models 320, 330, 340 and respective actual bit-streams 325, 335, 345 for three different subscription levels derived from the hypercube 310. A first subscription level removes decryption information for the third column from the 3×3 hypercube 310 to produce a first subscription level 3×2 logical model 320. Thus, logic units (2, 0), (2, 1) and (2, 2) are removed from the hypercube 310 to produce the first subscription level logical model 320. Continuing with the example above, the first subscription level would represent a high quality, low resolution version of the hypercube 310.

The second subscription level logical model 330 represents the second subscription level. In this subscription level, a row is logically removed from the hypercube 310. Thus, continuing with the image example above, the second subscription level would represent a low quality, higher resolution version of the hypercube 310.

In some embodiments, the data in the logic units 312 of a multi-dimensional model, such as the hypercube 310, may be decrypted using individual encryption keys. In some other embodiments, the data in the logic units 312 of the multi-dimensional mode may be encrypted with encryption keys based on decryption information that allows the encryption keys to be generated from the highest logic unit(s) of the hypercube to the lowest logic unit (0, 0) of the hypercube.

The third subscription level logical model 340 represents removal of a row and a column of logic units 312 from the hypercube 310. Thus, in the image example above, the third subscription level logical model 340 would represent a lower resolution, lower quality version of the image represented by the hypercube 310.

Figure 4:
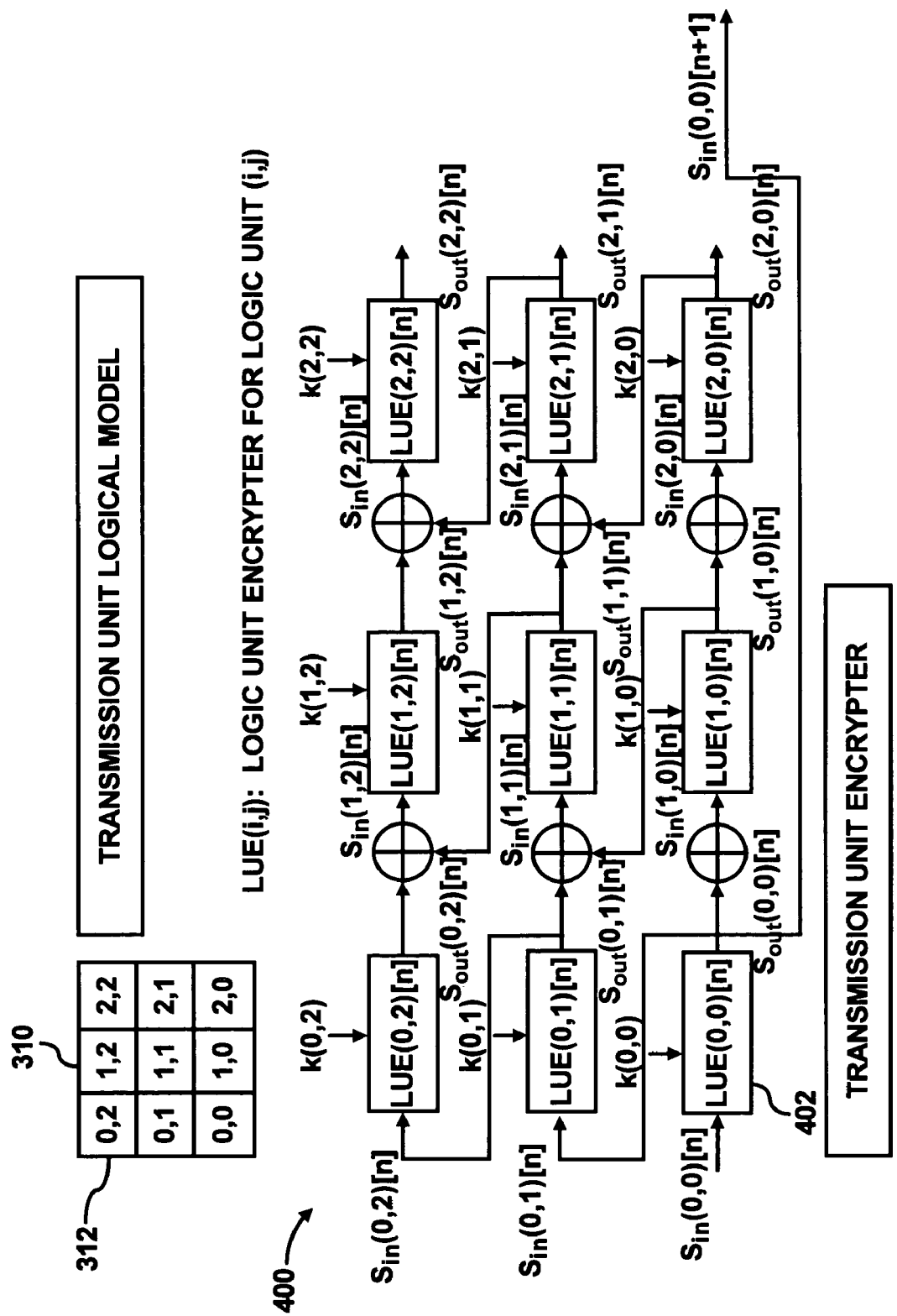
FIG. 4 illustrates an example of a transmission unit encrypter, according to an embodiment of the invention.

FIG. 4 illustrates an example of a transmission unit encrypter 400 using an encryption method where the starting state of the encryption engine for a logic unit may be derived from the ending states of the encryption engine of all of its causal adjacent logic units differing in exactly one co-ordinate. The transmission unit encrypter 400 is shown for illustrative purposes only. Any other method of encryption may be used with the embodiments described herein, including one where state propagation as in FIG. 4 is not used and logical units are encrypted independently. The transmission unit encrypter 400 includes a plurality of logic unit encrypters ("LUE") 402, which may be designed to encrypt each logic unit 312 of the hypercube 310.

The starting state, or Seed in ($S_{in}$), of the logic unit encrypter ("LUE") for a logic unit ($i_1, i_2 \ldots i_n$) is denoted by $S_{in}(i_1, i_2 \ldots i_n)$, and the ending state, or Seed out ($S_{out}$), after encryption of the logic unit ($i_1, i_2 \ldots i_n$) is denoted by $S_{out}(i_1, i_2 \ldots i_n)$. In one example, $S_{in}(0, 0 \ldots 0_n)$ may be chosen to be a random initialization vector. Then $S_{in}$ for each successive logic unit $S_{in}(i_1, i_2 \ldots i_n)$ may be chosen so that:

$$S_{in}(i_1, i_2 \ldots i_n) = S_{in}(i_{1-1}, i_2 \ldots i_n) \text{XOR } S_{in}(i_1, i_{2-1} \ldots i_n) \text{XOR} \ldots \text{XOR } S_{in}(i_1, i_2 \ldots i_{n-1}).$$

The data to be encrypted for each logic unit may be obtained by concatenating the bit-stream segments that map to the logic unit in the order in which they appear in the bit-stream. The diagram shown in FIG. 4 is generic, and applies to any logic unit encrypter. The $S_{in}$ and the $S_{out}$ may represent any state on which the encryption engine depends. As shown in FIG. 4, each LUE may receive an encryption key k with which to encrypt the logic unit. For example, LUE (0,2) [n] may be encrypted using encryption key k(0,2). Each encryption key k may be generated individually for each logic unit using a predetermined algorithm, or each encryption key k may be generated based on the processes described below with respect to FIGS. 5A, 5B, 5C, 6A, 6B, 6C and 7.

Thus, a user may subscribe to receive a maximum of $m_0 \times m_1 \times \ldots$ logic units, $1 \leq m_i \leq l_i$ with $m_0$, $m_1$ denoting maximum number of authorized layers along each dimension. The user is provided with all of the decryption keys $k(i_0, i_1, \ldots)$, where $0 \leq i_j \leq m_{j-1}, j=0, 1, \ldots, L-1$, to allow the user to decrypt only up to $m_0 \times m_1 \times \ldots$ logic units.

Figure 5A:
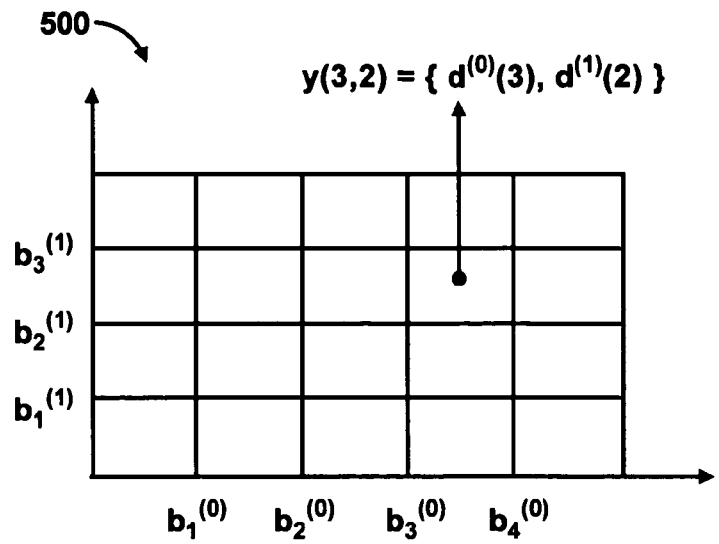
FIGS. 5A, 5B and 5C, collectively illustrate a process for providing predetermined subscription levels using one-way functions, according to an embodiment of the invention.
Figure 5B:
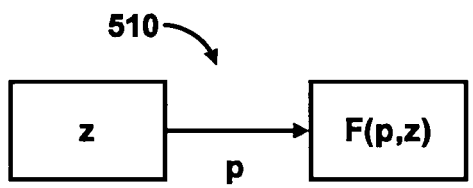
Figure 5C:
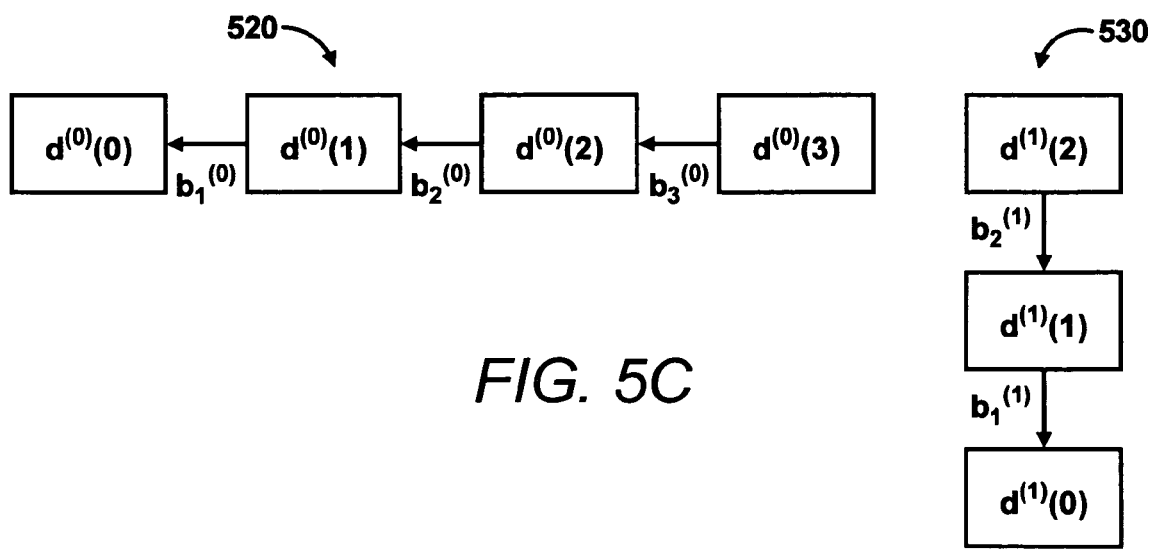

FIGS. 5A, 5B and 5C, collectively illustrate a process for providing predetermined subscription levels using one-way functions. According to the process illustrated in FIG. 5A, a user subscribes to receive a 4×3 hypercube, which includes up to logic unit (3,2). The user may be provided with a subscription key set, $y(m_0, m_1, \ldots, m_{L-1})$, where $m_i$ is the maximum number of authorized layers along the ith dimension. The subscription key set $y(m_0, m_1, \ldots, m_{L-1})$ is comprised by a set of binary keys for each dimension denoted as $\{d^{(0)}(m_0-1), d^{(1)}(m_1-1), \ldots\}$, where $d^{(j)}(m_j-1)$ is the dimension key for the jth dimension corresponding to the highest logic unit authorized for this dimension. Thus, in the present example, the user is provided with subscription key set $y(3,2)$ that is comprised by dimension keys $d^{(0)}(3)$ and $d^{(1)}(2)$, representing the highest logic units for the $0^{th}$ and $1^{st}$ dimensions respectively.

A one-way function, such as the one-way function 510 shown in FIG. 5B, may be used by the user to generate the decryption keys from the dimension keys. For symmetric encryption, decryption keys are the same as the encryption keys. For each dimension, starting from the dimension key corresponding to the highest logic unit authorized, a one-way function is used to generate the dimension keys for successively lower indices. That is, $d^{(j)}(i-1)=F^{(j)}_i(d^{(j)}(i))$, where $F^{(j)}_i(\ldots)$ is a one-way function corresponding to the ith index of the jth dimension. In another example, the dependence of the family of functions $F^{(j)}_i(\ldots)$ on j and i may be folded into a second parameter of a single one-way function $F(.,.)$ with two parameters, such that $F^{(j)}_i(z)=F(p^{(j)}_i, z)$, where $p^{(j)}_i$ is a parameter depending on j and i. Thus, in the one-way function 510 shown, a parameter p is applied to a second parameter z to generate a function $F(p, z)$. An example of such a binary one-way function in z is:

$$F(p,z)=E_p(z) \oplus z,$$

where $E_p(\ldots)$ is a symmetric block cipher with p as the key and $\oplus$ indicates the exclusive OR (or XOR) function. From $F(p, z)$, it is very difficult to obtain z, even when p is known. Other examples include:

$$F(p,z)=E_p(z \oplus p) \oplus z \oplus p,$$

$$F(p,z)=E_{p \oplus z}(z) \oplus z, \text{ etc.}$$

Thus, the user may be provided with the dimension keys with which to generate the decryption keys for each logic unit. The user may also be provided with a global key set x, which provides the second parameter with which to generate the decryption keys using the one-way function. Thus, the global key set $x=\{s\}$ where s is a seed which is used to generate a series of binary vectors $b^{(j)}_i$, where $i=1, 2, \ldots, m_{j-1}$, along each dimension $j=0, 1, \ldots, L-1$ by a deterministic process.

The user may apply the one-way function to the dimension keys using the binary vectors, as shown in FIG. 5C, to obtain the decryption keys for each logic unit. In the example shown, the binary vector $b_3^{(0)}$ may be applied to dimension key $d^{(0)}(3)$ to obtain the dimension key, $d^{(0)}(2)$, for the next lower logic unit along the dimension that is shown as horizontal in FIGS. 5A and 5C. Thus, $b_3^{(0)}$ is used as the p parameter and $d^{(0)}(3)$ is used as the z parameter in equation 510. This procedure is repeated until $d^{(0)}(0)$ is obtained, in the dimension shown by numeral 520.

The user may then apply the one-way function to dimension key $d^{(1)}(2)$ using the binary vector $b_2^{(1)}$ to obtain dimension key, $d^{(1)}(1)$, for the next lower logic unit along the dimension that is shown as vertical in FIGS. 5A and 5C. This procedure is repeated until $d^{(1)}(0)$ is obtained, in the dimension shown by numeral 530. The generated set of dimension keys may then be used to generate the decryption keys $k(i_0, i_1)$ with which to decrypt the logic units up to logic unit (3, 2) following a deterministic function G, such that $k(i_0, i_1) = G(d^{(0)}(i_0), d^{(1)}(i_1))$. The function G may be a simple XOR of the dimension keys or a concatenation. The decryption keys may be the same as the encryption keys if symmetric encryption is used. Otherwise, the encryption keys corresponding to these decryption keys are used to encrypt the bit-stream.

Figure 6A:
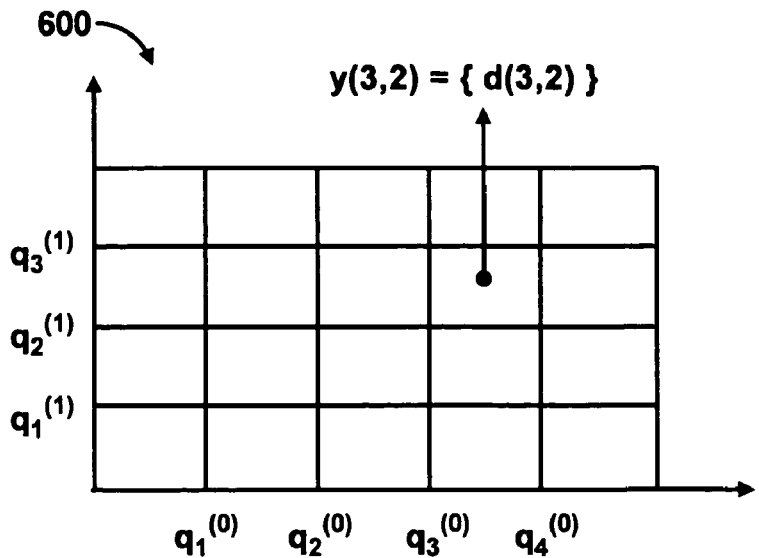
FIGS. 6A, 6B and 6C, collectively illustrate a process for providing predetermined subscription levels using one-way accumulator functions, according to an embodiment of the invention.
Figure 6B:
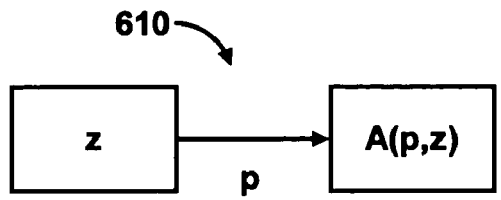
Figure 6C:
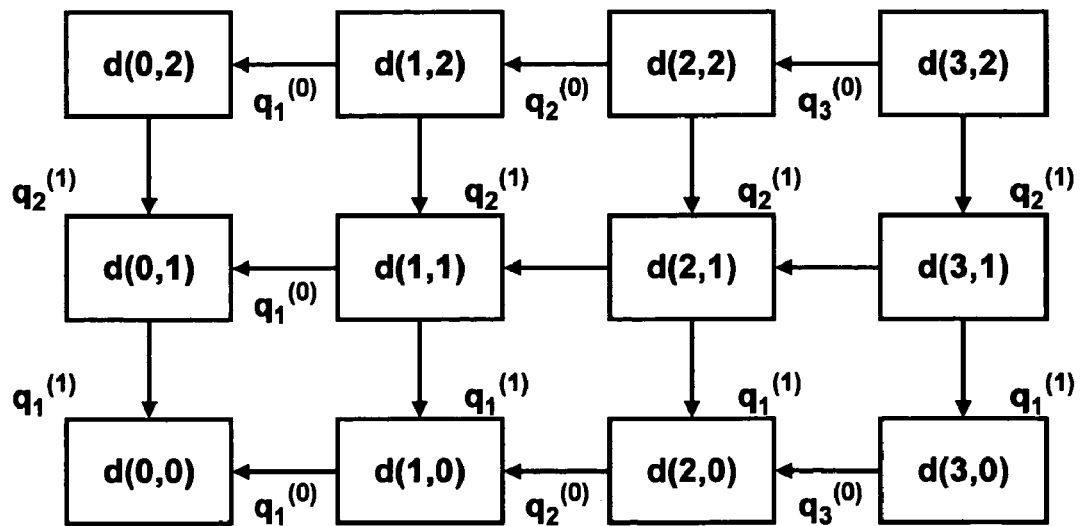

FIGS. 6A, 6B and 6C, collectively illustrate a process for providing predetermined subscription levels using one-way accumulator functions. According to the process illustrated in FIG. 6A, a user subscribes to receive a 4×3 hypercube, which includes up to logic unit (3,2). As described above, with respect to FIGS. 5A, 5B and 5C, the user may be provided with a subscription key set, $y(m_0, m_1, \ldots, m_{L-1})$ consisting of a single accumulation key $\{d(m_0-1, m_1-1, \ldots m_{L-1})\}$, where $m_i$ is the maximum number of authorized layers along the ith dimension. Thus, in the present example, the user is provided with $y(3,2)=\{d(3,2)\}$. In this process, the number of keys to be communicated is reduced further, and analysis of individual dimensions from the subscription key set y is made more difficult. This is accomplished by generating keys jointly along all of the dimensions. In order to ensure consistency of key propagation along multiple dimensions, one-way quasi-commutative functions may be used. Such functions $A: P \times Z \rightarrow Z$ have the property that $A(p_1, A(p_0, z))=A(p_0, A(p_1, z))$ for all $p_0, p_1 \in P, z \in Z$. Repeated application of such functions lead to one-way accumulators. An example of such a function is the well-known RSA (Rivest-Shamir-Adleman) accumulator $A(p,z)=z^p \mod r$, where r is a very large product of prime numbers. It is difficult to obtain z from the value of $A(p, z)$, p and r. Further, from the quasi-commutative nature of this function, it follows that:

$$A(p_1, A(p_0, z))=A(p_0, A(p_1, z)).$$

More generally, computation of $A(p_{K-1}, A(p_{K-2}, \ldots A(p_1, A(p_0, z)) \ldots))$ is independent of the order of the $P_K$'S. One way accumulators have been studied in the following papers: Josh Benaloh, Michael de Mare, "One-way Accumulators: A Decentralized Alternative to Digital Signatures", *Advances in Cryptology* (Proceedings of EuroCrypt '93. Lofthus, Norway. May 1993. ed. by T. Heleseth.) and Lecture Notes in Computer Science, ed. by G. Goos and J. Hartmanis. vol. 765, pp. 274-285. Springer-Verlag. New York. 1994.

Thus, the subscription key set $y(3,2)$ includes an accumulation key $d(3, 2)$. The user may be provided with the accumulation key $d(3,2)$ to generate the decryption keys for each logic unit. The user may also be provided with a global key set x, which provides the second parameter with which to generate the decryption keys using the one-way function. In this example, the global key set includes $x=\{s, r\}$ where s is a seed which is used to generate a series of dimension values $q^{(j)}_i$, where $i=1, 2, \ldots, m_{j-1}$, along each dimension $j=0, 1, \ldots, L-1$ by a known process.

The user may apply the one-way accumulator function to an accumulation key using the dimension values, as shown in FIG. 6C, to obtain the accumulation keys for each lower logic unit. In the example shown, the dimension value $q_3^{(0)}$ may be applied to dimension key $d(3,2)$ to obtain the accumulation key, $d(2, 2)$, for the next lower logic unit along the dimension that is shown as horizontal in FIGS. 6A and 6C. Thus, $q_3^{(0)}$ is used as the p parameter and d(3,2) is used as the z parameter in equation 610. The dimension value $q_2^{(1)}$ may be applied to accumulation key d(3,2) to obtain the accumulation key, d(3, 1), for the next lower logic unit along the dimension that is shown as vertical in FIGS. 6A and 6C. This procedure is repeated in both dimensions until the accumulation key d(0,0) is obtained.

The set of derived accumulation keys may then be used to generate the decryption keys $k(i_0, i_1)$ with which to decrypt the logic units up to logic unit (3, 2) following a deterministic function G, such that $k(i_0, i_1)=G(d(i_0, i_1))$. The decryption keys may be the same as the encryption keys if symmetric encryption is used. Otherwise, the encryption keys corresponding to these decryption keys are used to encrypt the bit-stream.

Figure 7:
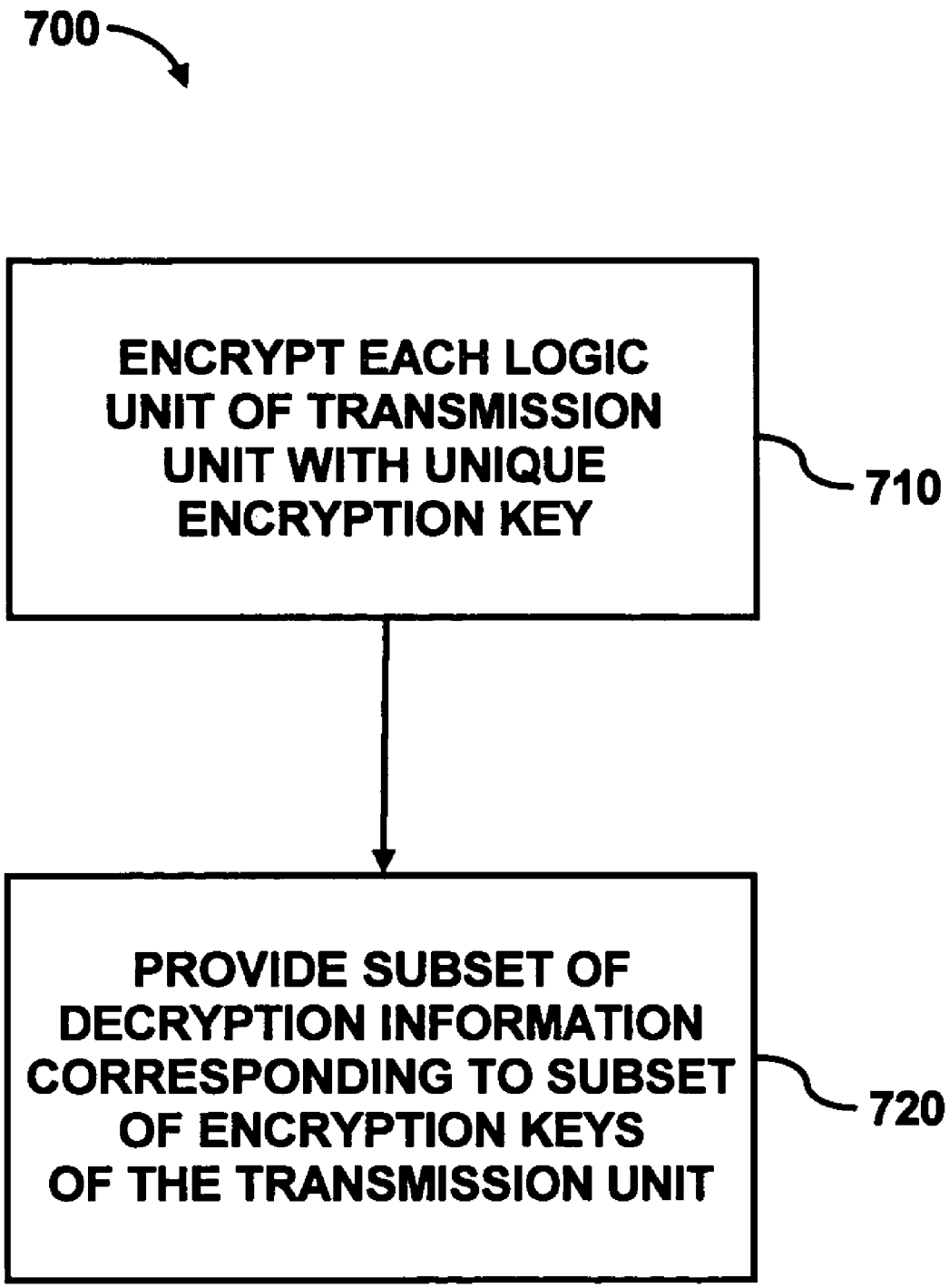
FIG. 7 is a flow diagram illustrating an example of a method of securely transmitting a decryption key usable to decrypt information in a transmission unit hypercube up to a predetermined decryption level.

FIG. 7 is a flow diagram illustrating an example of a method 700 of securely transmitting a decryption key usable to decrypt information in a transmission unit hypercube up to a predetermined decryption level.

At step 710, each logic unit of a transmission unit is encrypted with a unique encryption key. The unique encryption keys for the transmission unit form a set of encryption keys. Each of the encryption keys may be generated separately or using an algorithm through which the encryption keys may be related. In some embodiments, the encryption process may be dependent on the decryption processes.

In some examples in which a one-way function is used, a random number s is selected. Then, a series of binary vectors $b_i^{(j)}$ are generated, where $i=1, 2, \ldots, m_{j-1}$, along each dimension $j=0, 1, \ldots, L-1$ by a deterministic process. The binary vectors $b_i^{(j)}$ may be generated by simple functions: $b_i^{(j)}=h_i^{(j)}(s)$, such as flip first i bits of s followed by circular right shift by j bits. Alternatively, the binary vectors $b_i^{(j)}$ may be generated by a combination of a known quasi-random number generation method and simple functions, such as obtain L initial seeds $s^{(j)}$ of a random number generator by circular right-shift of s by j bits, and then generate $b_i^{(j)}$ values as outputs of the generator initialized with $s^{(j)}$ as the seed. The binary vectors $b_i^{(j)}$ may also be chosen as the same for all values along the same dimension. These values would be known to all subscribers irrespective of the subscription level, because they depend only on s.

A random set of dimension keys $\{d^{(0)}(l_0-1), d^{(0)}(l_1-1), \ldots\}$ may be generated for the maximum possible hypercube for the transmission unit. The dimension keys are generated using the equation $d^{(j)}(i-1)=F(b_i^{(j)}, d^{(j)}(i))$, where $F(.,.)$ is a one-way function, as discussed above, for $i=m_j-1, m_j-2, \ldots 1$, for each $j=0, 1, 2, \ldots L-1$. Because of the one-way nature of these functions, $d^{(j)}(i)$ cannot be obtained from $d^{(j)}(i-1)$, even though $b_i^{(j)}$ is known.

Logic unit decryption keys k ($i_0, i_1, \ldots$), $0 \leq i_j \leq m_j-1$ may be generated as a deterministic function of $d^{(0)}(i_0)$, $d^{(1)}(i_1), \ldots$, such as:

$$k(i_0, i_1, \ldots)=d^{(0)}(i_0) \oplus d^{(1)}(i_1) \oplus \ldots,$$

if all dimension keys have the same length as the logical unit decryption key.

Prior to transmission of the transmission unit, each logic unit is encrypted by the encryption key corresponding to the generated decryption key for that logic unit. For symmetric encryption, the encryption and decryption keys may be the same.

In the one-way function process described above, if it is assumed that the L dimension keys $d^{(j)}(m_j-1)$ comprising $y(m_0, m_1, \ldots, m_{L-1})$, as well as the generated logic unit decryption key, have the same length, the total length of the key sets $\{x, y(m_0, m_1, \ldots, m_{L-1})\}$ sent to each subscriber is L-times the length of the logic unit decryption keys+the length of seed s.

In some examples in which accumulator functions are used, a random number s is generated, and a random large integer r, which is a product of distinct safe prime numbers is selected. A prime p is safe if it can be expressed as $p=2p'+1$, where p' is an odd prime. It has been shown that such choice of r makes the one-way accumulator function especially hard to break. Also, a random large integer is selected as the accumulation key $d(l_0-1, l_1-1, \ldots, l_{L-1}-1)$ corresponding to the maximum possible hypercube. A series of dimension values $q_i^{(j)}<r$, $i=1, 2, \ldots, m_j-1$, along each dimensions $j=0, 1, \ldots, L-1$ by any known process. For example, L seeds $s^{(j)}$ of a random number generator may be generated, one for each dimension, by circular shift of s bits by j bits. Then, random bits from the generator initialized with $s^{(j)}$ as seed may be obtained to obtain the sequence of integers $q_i^{(j)}$, where $q_i^{(j)}$ is of the same order as r. These values are known to all subscribers irrespective of the subscription level because they only depend on s.

Backward recursions are then used to generate the accumulation keys from the highest level logic unit to the accumulation key d(0, 0), corresponding to the first logic unit. The backward recursions begin with $i_0=m_0-1, i_1=m_1-1, \ldots, i_{L-1}=m_{L-1}-1$. The backward recursions may include, for example:

$$d(i_0-1, i_1, \ldots, i_{L-1}) = A(q_{i_0}^{(0)}, d(i_0, i_1, \ldots, i_{L-1}));$$
$$d(i_0, i_1-1, \ldots, i_{L-1}) = A(q_{i_1}^{(1)}, d(i_0, i_1, \ldots, i_{L-1}));$$
$$\vdots$$
$$d(i_0, i_1, \ldots, i_{L-1}-1) = A(q_{i_{L-1}}^{(L-1)}, d(i_0, i_1, \ldots, i_{L-1})).$$

The commutative nature of the one-way accumulator provides consistency to the backward recursions.

Decryption keys k ($i_0, i_1, \ldots$), $0 \leq i_j \leq m_j-1$ may be generated as a known function of accumulation keys $d(i_0, i_1, \ldots,)$. Typically, the integer accumulation key $d(i_0, i_1, \ldots, i_{L-1})$ may need a larger number of bits to represent than the number of key bits used for a block cipher. In this case, a hash of $d(i_0, i_1, \ldots, j_{L-1})$ may be used to obtain the decryption key k ($i_0, i_1, \ldots$). Prior to transmission, each atom is encrypted by the encryption key corresponding to the generated decryption key for the atom. For symmetric encryption, the encryption and decryption keys may be the same.

In the one-way accumulator function process, the integer r and the accumulation key are of the same order, and can be represented with the same number of bits. Therefore, the total length of the key sets $\{x, y(m_0, m_1, \ldots, m_{L-1})\}$ provided to each subscriber is twice the length that may represent the integer r+the length of the seed s. Since this is independent of the subscription level and the number of dimensions, this length may be constant for all generalized scalable bit-streams.

At step 720, a user is provided with a subset of decryption information that corresponds to a subset of the encryption keys. The subset of the decryption information allows decryption of a subset of the logic units in the transmission unit up to a predetermined decryption level of the transmission unit. The predetermined decryption level of the transmission unit may correspond to a subscription level to which the user has subscribed. The subscription level may include a subscription level for one or more scalable features of the transmission unit, such as instance, quality, resolution, temporal, interactivity, and so on.

If each logic unit is encrypted with a separate encryption key, the subset of decryption information may include a subset of the decryption keys associated with the subset of the encryption keys. For example, if the subscriber subscribes to a hypercube having the size $m_0 \times m_1 \times \ldots$, the user will be provided with all of the decryption keys $k(i_0, i_1, \ldots)$, where $0 \leq i_j \leq m_{j-1}$, $j=0, 1, \ldots, L-1$ corresponding to the $m_0 \times m_1 \times \ldots$ logical units.

If the one-way function process, described above, is used, the subset of decryption information includes a global key set x, where $x=\{s\}$ and a subscription key set y, where $y(m_0, m_1, \ldots, m_{L-1})=\{d^{(0)}(m_0-1), d^{(1)}(m_1-1), \ldots\}$. If the one-way accumulator function is used, the decryption information may include a global key set x, where $x=\{s, r\}$ and a subscription key set y, where $y(m_0, m_1, \ldots, m_{L-1})=\{d(m_0-1, m_1-1, \ldots m_{L-1})\}$.

Figure 8:
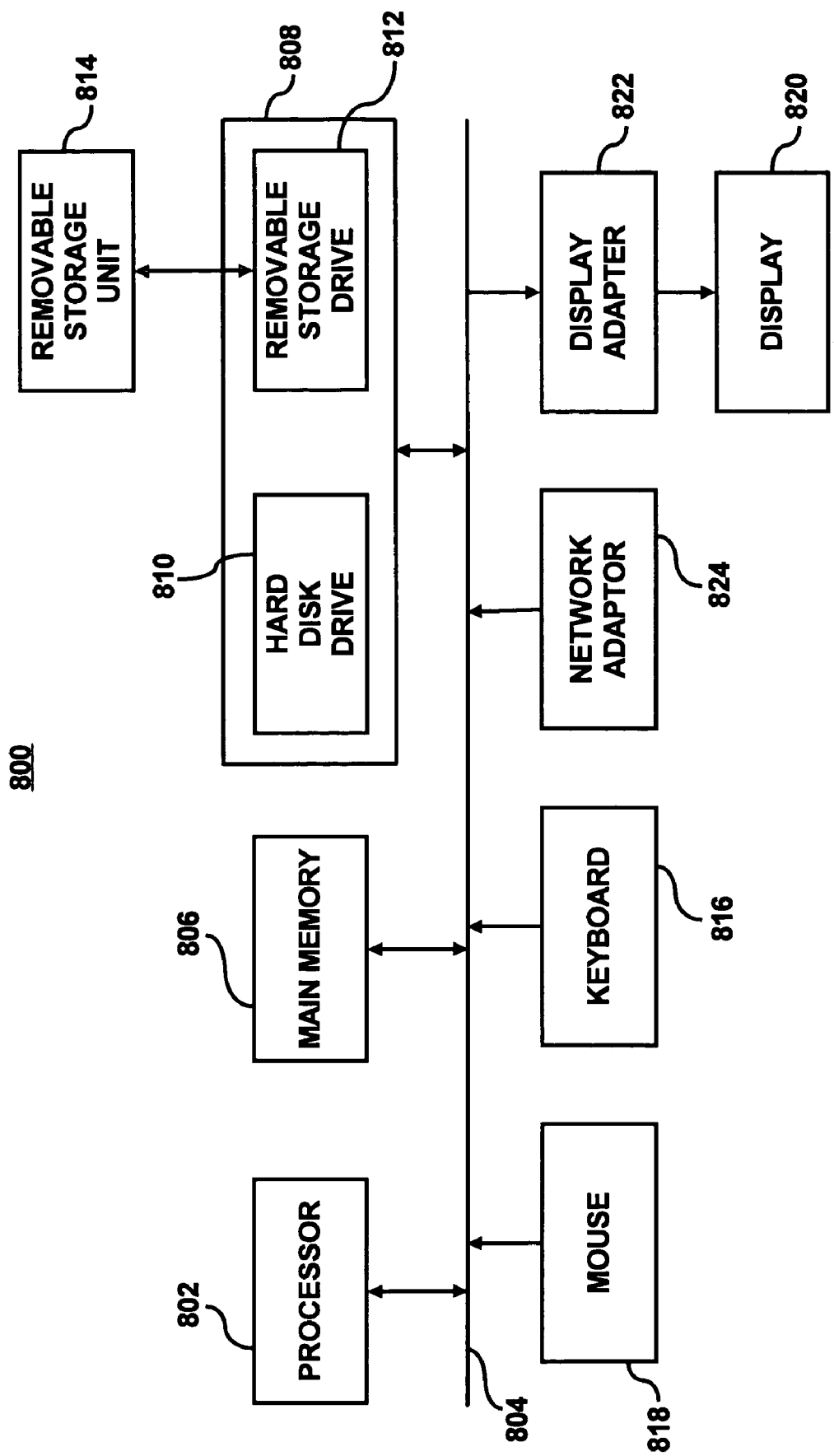
FIG. 8 is a block diagram illustrating a computer system operable to perform the method depicted in FIG. 7.

FIG. 8 illustrates a computer system 800 operable to control the process of transmitting generalized scalable bit-streams described with respect to the method 700 of FIG. 7. In this respect, the computer system 800 may be used as a platform for executing one or more of the functions described hereinabove with respect to the various steps outlined in the method 700.

The computer system 800 includes one or more controllers, such as a processor 802. The processor 802 may be used to execute some or all of the steps described in the method 700. Commands and data from the processor 802 are communicated over a communication bus 804. The computer system 800 also includes a main memory 806, such as a random access memory (RAM), where a program code may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the method 700 may be stored.

The removable storage drive 812 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor 802 may communicate over a network, for instance, the Internet, LAN, etc., through a network adaptor 824.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is a preferred embodiment along with some of its variations. The terms, descriptions and figures used herein are set forth by way of illustration only and are not meant as limitations. Those skilled in the art will recognize that many variations are possible within the spirit and scope of the embodiments, which are intended to be defined by the following claims—and their equivalents—in which all terms are meant in their broadest reasonable sense unless otherwise indicated.

What is claimed is:

1. A method of transmitting a transmission unit of a generalized scalable bit-stream, the transmission unit being modeled in a multi-dimensional scalable representation including a plurality of logic units, the method comprising:

encrypting a plurality of logic units of the transmission unit using an unique encryption key for each logic unit, wherein the unique encryption keys for the transmission unit form a set of encryption keys; and providing a user with an accumulation key that is generated through key propagation along multiple dimensions of a hypercube, wherein the accumulation key is to be used in a one way accumulator function, and wherein the accumulation key allows decryption of a subset of the logic units in the transmission unit up to a predetermined decryption level of the transmission unit.

2. The method of claim 1, wherein providing the user with the subset of decryption information comprises providing a subset of decryption information which allows decryption of the transmission unit up to a subscription level.

3. The method of claim 2, wherein providing the subset of decryption information which allows decryption of the transmission unit up to the subscription level comprises providing a subset of decryption information which allows decryption of the transmission unit up to a subscription level for a scalable feature of the transmission unit.

4. The method of claim 1, wherein providing the subset of decryption information comprises providing a global decryption key set, wherein the global decryption key set is configured to be used with other decryption information in the subset of the decryption information to decrypt the transmission unit.

5. The method of claim 1, further comprising:

selecting a random number as a seed, a first random large integer which is a product of safe primes, said accumulation key corresponding to a maximum possible hypercube of the transmission unit and including a second random large integer.

6. The method of claim 5, further comprising:

generating a series of key state values along each dimension of the hypercube;

generating the accumulation key using backward recursion, from a last cube of the hypercube to a first cube of the hypercube; and generating logic unit decryption keys as a function of the accumulation key, wherein encrypting each logic unit of the transmission unit comprises encrypting each logic unit using the encryption key corresponding to the generated decryption key for the logic unit.

7. The method of claim 6, wherein generating the logic unit encryption keys as a function of the accumulation key comprises using a hash function of the accumulation key to generate the logic unit encryption keys.

8. The method of claim 6, wherein providing the subset of decryption information comprises providing the accumulation key to correspond to the highest logic unit of the predetermined decryption level.

9. The method of claim 8, wherein providing the subset of decryption information further comprises providing a global key set configured to be used for any decryption level of the transmission unit to use in the one-way accumulator function with the accumulation key corresponding to the highest logic unit of the predetermined decryption level to generate the decryption keys, wherein the global key set includes the seed and the first random large integer.

10. The method of claim 1, further comprising:
    decrypting a subset of the logic units in the transmission unit up to the predetermined decryption level of the transmission unit using the subset of decryption information that corresponds to the subset of the encryption keys.

11. An apparatus for transmitting a transmission unit of a generalized scalable bit-stream, the transmission unit being modeled in a multi-dimensional scalable representation including a plurality of logic units, the system comprising:
    an encryption engine configured to, encrypt a plurality of logic units of the transmission unit using an unique encryption key for each logic unit, wherein the unique encryption keys for the transmission unit form a set of encryption keys; and
    a license manager configured to provide a user with an accumulation key that is generated through key propagation along multiple dimensions of a hypercube, wherein the accumulation key is to be used in a one way accumulator function, and wherein the accumulation key allows decryption of a subset of the logic units in the transmission unit up to a predetermined decryption level of the transmission unit.

12. A system for transmitting a transmission unit of a generalized scalable bit-stream, the transmission unit being modeled in a multi-dimensional scalable representation including a plurality of logic units, the system comprising:
    means for encrypting a plurality of logic units of the transmission unit using an unique encryption key for each logic unit, wherein the unique encryption keys for the transmission unit form a set of encryption keys; and
    means for providing a user with an accumulation key that is generated through key propagation along multiple dimensions of a hypercube, wherein the accumulation key is to be used in a one way accumulator function, and that wherein the accumulation key allows decryption of a subset of the logic units in the transmission unit up to a predetermined decryption level of the transmission unit.

13. A computer readable storage medium on which is embedded one or more computer programs, said one or more computer programs implementing a method of encrypting a transmission unit of a generalized scalable bit-stream, the transmission unit modeled in a multi-dimensional scalable representation including a plurality of logic units, said one or more computer programs comprising a set of instructions for:
    encrypting a plurality of logic units of the transmission unit using an unique encryption key for each logic unit, wherein the unique encryption keys for the transmission unit form a set of encryption keys; and
    providing a user with an accumulation key that is generated through key propagation along multiple dimensions of a hypercube, wherein the accumulation key is to be used in a one way accumulator function, and wherein the accumulator key allows decryption of a subset of the logic units in the transmission unit up to a predetermined decryption level of the transmission unit.

* * * * *

UNITED STATES PATENT AND TRADEMARK OFFICE
CERTIFICATE OF CORRECTION

PATENT NO. : 7,522,724 B2
APPLICATION NO. : 11/030096
DATED : April 21, 2009
INVENTOR(S) : Debargha Mukherjee It is certified that error appears in the above-identified patent and that said Letters Patent is hereby corrected as shown below:

In column 10, lines 44-45, delete "d(io, il,..., jL-1)" and insert -- d(io, il,..., iL-1) --, therefor.

In column 14, line 7, in Claim 12, before "wherein" delete "that".

Signed and Sealed this

Seventeenth Day of November, 2009

David J. Kappos
*Director of the United States Patent and Trademark Office*